Feb. 28, 1939. C. J. STEELE ET AL Re. 21,019

BATHTUB

Original Filed June 21, 1934

INVENTORS.
Carmi J. Steele,
BY Roy C. Troeger.
Dike, Calver & Gray
ATTORNEYS.

Reissued Feb. 28, 1939

Re. 21,019

UNITED STATES PATENT OFFICE 21,019

BATHTUB

Carmi J. Steele, Maywood, and Roy C. Troeger, Los Angeles, Calif., assignors, by direct and mesne assignments, to Briggs Manufacturing Company, Detroit, Mich., a corporation of Michigan Original No. 1,993,420, dated March 5, 1935, Serial No. 731,607, June 21, 1934. Application for reissue February 25, 1937, Serial No. 127,712

5 Claims. (Cl. 4—173)

Our invention relates to a construction and mounting of a cast or pressed metal bath of the enameled type and is designed to secure a water-tight joint with the upper portion of the bath and wall tiling extending above the bath.

It is a frequent practice in the installation of bathtubs to have a wall facing of tile, plaster or other material extending upwards from the horizontal rim flange or flanges extending laterally along the upper edges of the side walls of the tub. Frequently a loose joint develops at the connection of the tub and the wall facing permitting water to seep therebetween. Moreover, where the wall facing rests upon the horizontal rim flange of the tub water splashed up from the tub basin or flowing down the face of the tile wall lodges or becomes entrapped at the joint, particularly if the joint has deteriorated sufficiently to permit seepage beneath the lower edge of the wall facing.

An object of our invention is to provide a bathtub in which at least one of its upright side walls terminates at its upper edge in a laterally extending rim flange offset upwards and thence laterally to reenforce the same and to provide a substantially horizontal ledge or seat spaced vertically from the rim flange and providing a seat for the lower edge of a wall facing, the ledge terminating in an upstanding reenforcing flange adapted to extend upward behind the tile or other wall facing.

Another object and feature of our invention is in using the upwardly extending flange at the back of the tile for attaching the back and preferably both ends of the bath to a separate frame such as wood studs commonly used in interior wall construction. This causes a suspension of the bath at this studding at the back and both ends, the front wall of the bath extending to the floor and preferably having an inset portion to accommodate the front portion of the foot of a bather or a person cleaning the bath.

Another object and feature of our invention is forming the bathtub with an upwardly extending skirt section, this being vertical and adapted to fit snugly against the supporting studs or a construction built on the edge of these studs, and providing a laterally extending horizontal seat or ledge at the upper end or edge of the skirt, the ledge terminating in an upstanding reenforcing flange adapted to extend upwards behind the wall facing.

Another detailed feature is building the tiled wall finish above the bath with the lower tier of tile resting on this seat or ledge and bringing the front face of the tile in vertical alignment with the skirt. The ledge is of sufficient width to accommodate the cement for bedding the tile and the upper portions of the studs are provided with a suitable wall or lathe surface on which the bedding cement may be secured.

Our invention is illustrated in connection with the accompanying drawing, in which.

Figure 1:
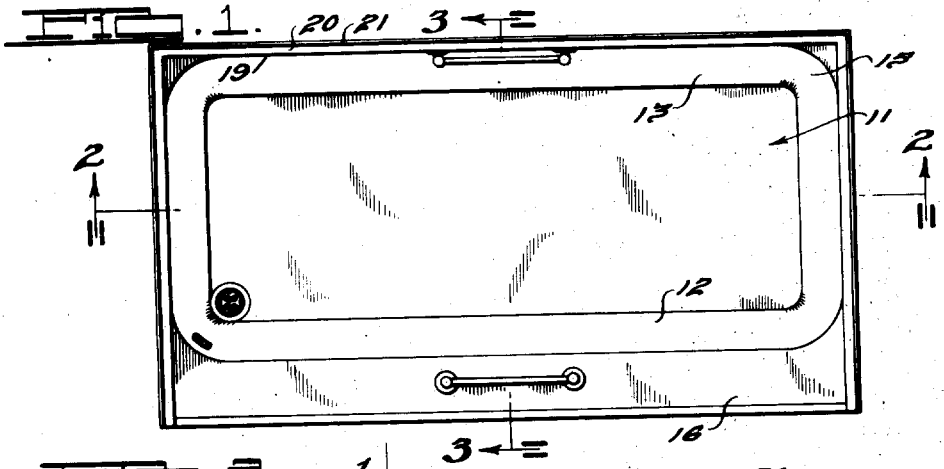
Fig. 1 is a plan of a bath taken in the direction of the arrow 1 of Fig. 2.
Figure 2:
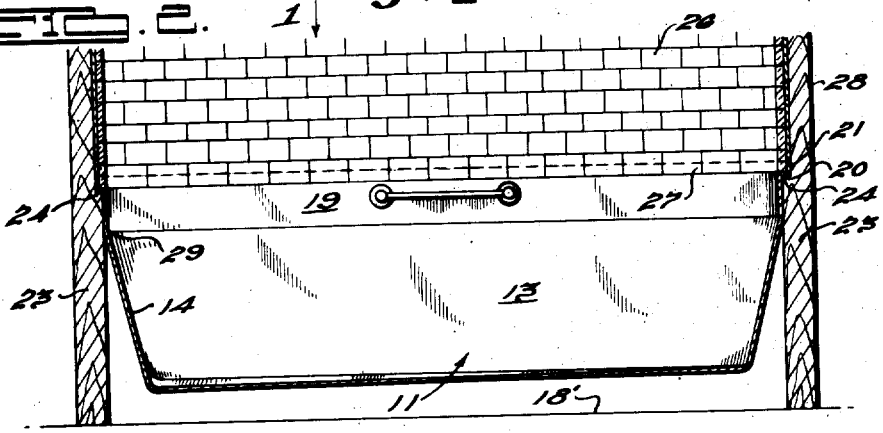
Fig. 2 is a longitudinal vertical section on the line 2—2 of Fig. 1 in the direction of the arrows.
Figure 3:
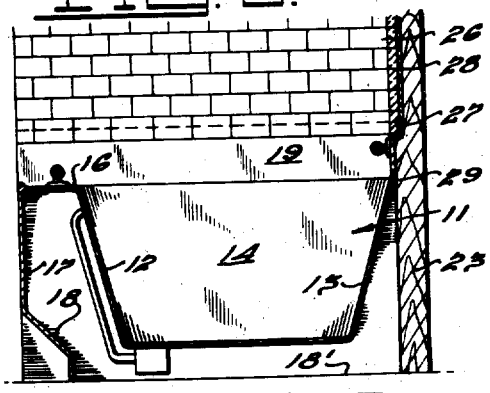
Fig. 3 is a transverse vertical section on the line 3—3 of Fig. 1 in the direction of the arrows.

Dealing first with the bath of Figs. 1, 2 and 3, this has a bath portion 11 with front wall 12, rear wall 13, and end walls 14 joined by corner sections 15. A horizontal surface or rim flange 16 which may form a seat is constructed along the front portion of the bath. From this there is a front depending wall 17 with an inset or recess section 18, the lower end of which rests on the floor 18'.

The upper portion of the bath is formed with an upwardly extending skirt 19 on the two ends and the back. This extends above the horizontal seat or flat surface 16. Above this there is a horizontal ledge 20 extending outwardly and above this ledge and at the edge thereof there is a small vertical flange 21. This flange is provided with a series of slots 22.

The bath is installed by employing studs 23 of the building which studs may have a notch section 24. The ledge 20 rests on this notch section. Nails 25 may then be driven through the slots 22 into the portion of the studs above the notch 24. If desired, instead of notching the studs, a strip of wood may be nailed on the studs forming a vertical backing for the skirt 18 and the top of the strip forming a shoulder to engage the ledge 20. With this construction the bath is supported at the ends and inner side by the studs due to the support at the ledge 20 and being nailed by the nails through the small vertical flange 22.

In the installation of the bathtub we preferably utilize a tile or other wall facing 26. The lower tier 27 of these tiles rests on the ledge 20 and is bedded thereon by cement, mortar, or the like. A cement bedding material 28 extends upwardly on the front face of the flange 21 and on a suitable wall or plaster construction connecting the various studs and also on the face of these studs. This bed is of such a depth that when the tiles are built into place the exposed vertical base of the tiles is in alignment with the face or skirt 19. The tiles obviously may be joined one with the other in any suitable manner or design.

With this construction when the bath assembly is used in a shower bath with overhead water jets spraying on the tiled walls, the water runs down from these walls, and the tile joints should be made sufficiently tight so that water will not seep through the joints. However, if any water seeps underneath the lower tier of tile at the ledge 20 it is stopped by the outwardly extending flange 21 and drips back over the skirt and thus into bath so that with our construction there can be no water seep underneath the lower tier of tiles and fall down the studding or other wall construction.

Figure 4:
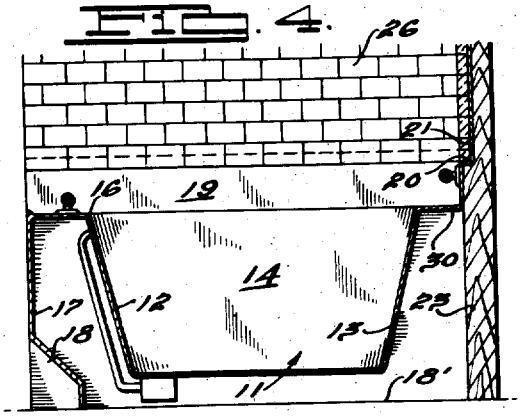
Fig. 4 is a section similar to Fig. 3 showing a modified construction with a horizontal surface at the back of the bath.
Figure 5:
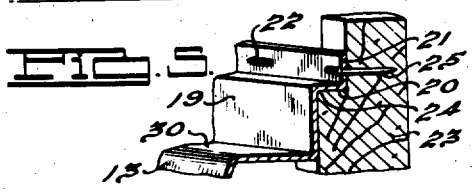
Fig. 5 is a perspective detail of the rear portion of the bath illustrated in Fig. 4.

In the construction of Figs. 1, 2 and 3 we have shown an obtuse angle 29 where the rear wall 13 joins the skirt and also the end walls 14. In the construction of Fig. 4 a horizontal rim flange or shelf 30 may extend laterally from one or more of the upright side or end walls of the bath proper to the skirt 19. The width of this depends on the space available for the bath, but in a bath of this construction the skirt with the seat 20 and flange 21 is utilized so that when the tiling is bedded in place, the drip from the tiling will be directly down the face of the skirt and into the tub proper. It will be understood that the width of the rim flange 30 as also the height to which this flange is upwardly offset to form the reenforcing portion 19 may be varied in accordance with particular requirements while accomplishing the purposes of the invention. The upright shoulder or skirt portion 19 tends to prevent water, splashed up over the rim, flowing into or lodging in the joint between the lower edge of the wall facing 26 and the ledge or seat 20. The upstanding flange 21 not only, in conjunction with the angular formation 30 and 19, reenforces the rim but also prevents any water seeping beneath the wall facing and down behind the tub.

Various changes may be made in the details of construction without departing from the spirit or scope of the invention as defined by the appended claims.

We claim:

1. A bathtub having a tub portion with side and end walls and a vertical skirt extending upwardly from at least one of said walls, a horizontal ledge at the upper end of the skirt, a vertical flange above the ledge, a tile wall having the lower tier of tile resting on the said ledge, the face of the tile and the face of the skirt being in substantial alignment, a wall structure having a seat engaging the underside of the ledge and forming a support for a portion of the bathtub, the said flange having nail holes for the reception of nails adapted to be driven therethrough into the supporting wall structure.

2. In a device as described, the combination of a bathtub having a tub portion with side and end walls and a bottom, a horizontal seat extending laterally from at least one of the walls, a vertical skirt extending upwardly from at least one of said walls, a horizontal ledge at the upper edge of the skirt extending outwardly, and a wall construction having a horizontal shoulder on which the said ledge rests and supports the bath on at least one side, the wall having a finished facing material resting at its lower edge on the ledge, the surface of the facing material and the surface of the skirt being in substantial alignment.

3. In a device as claimed in claim 2, the seat in the wall structure being formed in studs, and an upwardly extending flange on the upper edge of the ledge and at right angles thereto extending upwardly above the shoulder of the studs, said flange having nail holes with nails driven therethrough into the stud.

4. A bathtub having a tub portion with upright side and end walls, at least one of said walls terminating at its upper edge in a laterally extending rim flange offset upwardly and thence laterally to provide a substantially horizontal ledge spaced vertically from said flange and providing a seat for the lower edge of a wall facing, said ledge having an upstanding reenforcing flange adapted to extend upwards behind the wall facing.

5. A bathtub having a tub portion with upright front, back and end walls, said walls terminating at their upper edges in laterally extending generally horizontal rim flanges, the rim flange at the upper edge of the front wall terminating in a depending skirt, the remaining three rim flanges being extended upwards above the horizontal plane thereof and thence laterally to provide a substantially horizontal ledge extending continuously around three sides of the tub providing a seat for a wall facing along the back and ends of the tub, said ledge having an upstanding reenforcing flange adapted to extend upwards behind the wall facing.

CARMI J. STEELE.
ROY C. TROEGER.